UNITED STATES PATENT OFFICE.

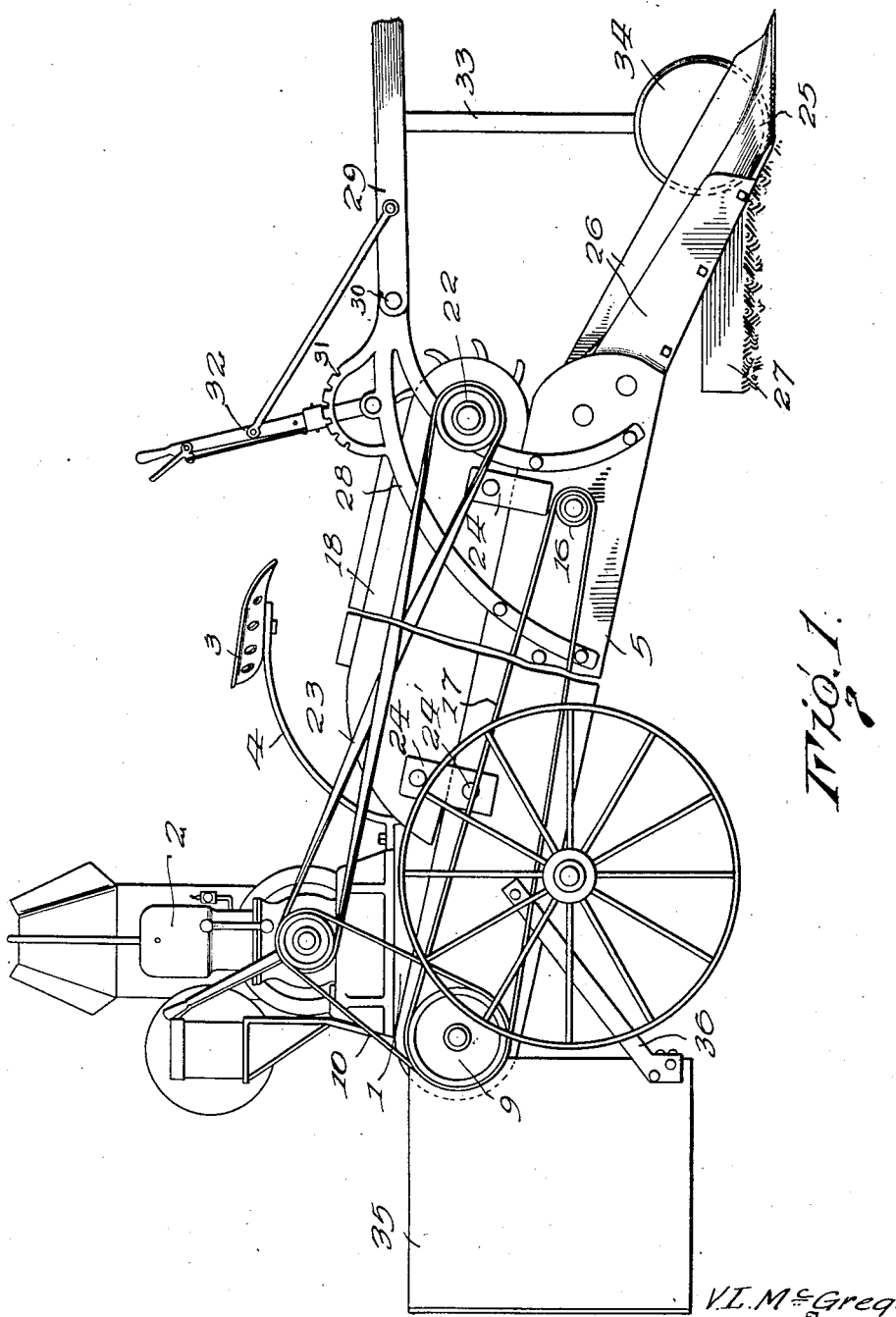

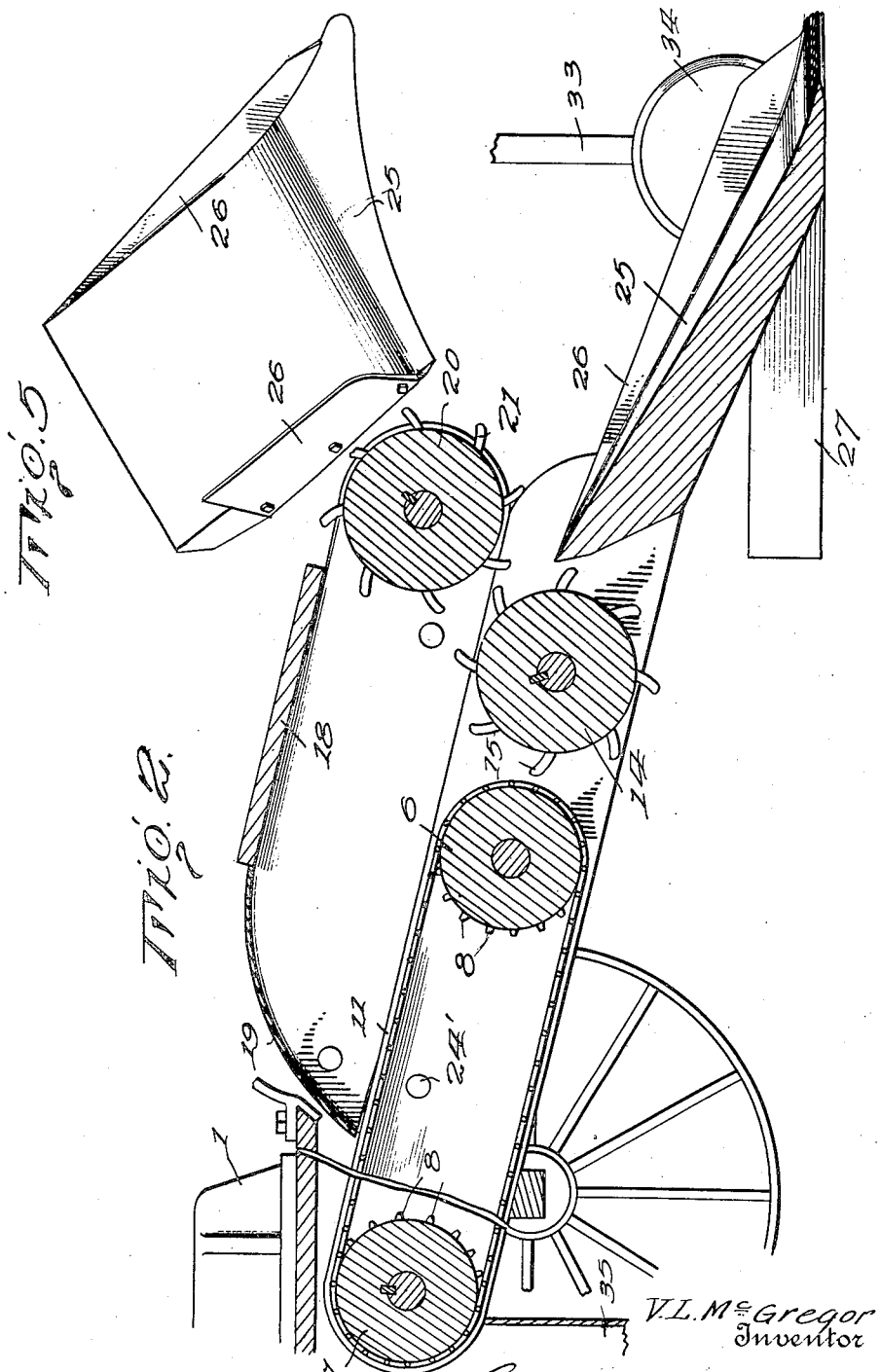

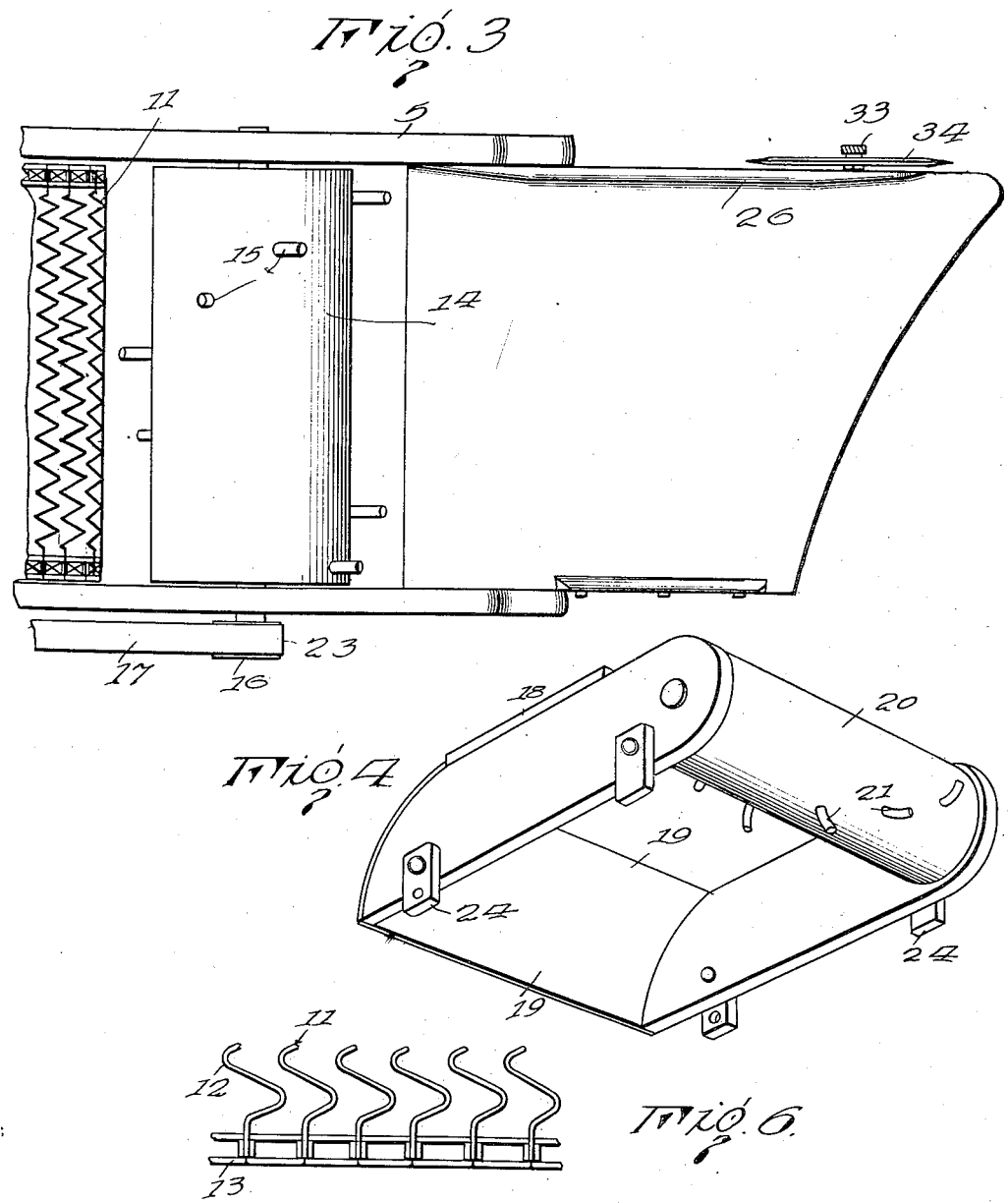

VIRGIL L. McGREGOR, OF CROOKSTON, MINNESOTA.

COMBINED EARTH-DISINTEGRATING AND WEEDING MACHINE.

1,245,252.     Specification of Letters Patent.     Patented Nov. 6, 1917.

Application filed May 15, 1917. Serial No. 168,830.

*To all whom it may concern:*

Be it known that I, VIRGIL L. McGREGOR, a citizen of the United States, and resident of Crookston, in the county of Polk and State of Minnesota, have invented certain new and useful Improvements in Combined Earth-Disintegrating and Weeding Machines, of which the following is a specification.

This invention relates to earth cultivating devices and has more especial reference to a combined earth disintegrating and weeding machine.

The invention has for its dominant object to provide a cultivating device combining the features of a plow, a harrow and a weeder, whereby soil being worked thereby will be thoroughly disintegrated and freed of weeds or like growths and discharged from the device in a single operation.

Another object of the invention is to provide earth disintegrating rolls for breaking the clods of earth delivered thereto; these rolls being rotated at varying velocities, thus, insuring perfect pulverization.

It is also an object of the invention to provide a screening apron arranged rearwardly of the disintegrating rolls for receiving the broken or disintegrated earth, freeing the same of weeds and discharging it onto the field, the weeds passing into a waste receiving receptacle.

A further object of the invention is to provide means for regulating the depth of engagement of the digging or plow element of the device with the soil to be cultivated thereby.

Other objects will be in part obvious and in part pointed out hereinafter.

The invention accordingly consists in the features of construction, combinations of elements and arrangement of parts which will be exemplified in the construction set forth, and the scope of the application of which will be indicated in the following claims.

In the accompanying drawings, wherein is shown one of various possible embodiments of my invention;

Figure 1 is a side elevation of the improved machine;

Fig. 2 is a fragmentary longitudinal section through the cultivating apparatus thereof;

Fig. 3 is a fragmentary top plan showing the arrangement of the plow mold board with relation to one of the earth disintegrating rolls;

Fig. 4 is a detail in perspective showing a mounting of the second earth disintegrating roll, and a novel formation of hood;

Fig. 5 is a detail in perspective of the plow; and

Fig. 6 is a fragmentary detail in top plan of the endless screening apron.

Similar reference characters refer to similar parts throughout the several views of the drawings.

Referring now more particularly to the drawings, 1 designates a wheeled carriage having a suitable bed thereon for supporting an internal combustion engine 2 or other source of motive power, whereby the various parts of the machine which will be subsequently described, may be driven. A seat 3 is carried upon a spring standard 4 also secured to the carriage 1 and serves an obvious purpose.

Extending longitudinally of the carriage 1 is an inclined frame 5 having rolls 6 and 7 rotatably mounted in the sides thereof and provided with peripherally disposed gear teeth 8. Upon the shaft of the roll 7 a pulley 9 is mounted and as shown in the Fig. 1 receives about its periphery a driving belt 10, the belt in turn extending into engagement with the power shaft of the engine 2.

About the rolls 6 and 7 there is arranged a screening apron generally indicated by the numeral 11, the said apron being formed of transversely disposed body wires having their intermediate portions formed in a zigzag manner as indicated at 12 and the opposite ends engaged with the links 13 of ordinary sprocket chains, these chains, obviously, passing about the peripherally disposed gear teeth 8. In this connection, it is to be noted that the intermediate portions of the body wires of the apron are so arranged with relation to each other as to provide an efficient screen or sifting device, whereby the earth delivered thereonto will be permitted to sift therethrough but the weeds and other like growths separated from the same and carried rearwardly into a suitable waste receiving receptacle hereinafter described.

An earth disintegrating roll 14 having spirally disposed teeth 15 arranged about its periphery is mounted between the sides of the longitudinal frame 5 in proximity to its forward end; the shaft carrying the said roller having one end extended and provided with a pulley 16 about which a driving belt 17 is arranged, the rear end of the driving belt extending about the pulley 9.

Positioned above the longitudinal frame 5 and covering a portion thereof is a hood 18 having a curved deflecting wall 19 formed in its rear extremity while the forward portion thereof is open and has rotatably arranged therein a second earth disintegrating roll 20 having spirally disposed teeth 21 arranged about its periphery. As will be noted, the shaft carrying the roll 20 is extended at one end and carries a pulley 22 with which a drive belt 23 is engaged, the said belt extending from the power shaft of the engine 2 and being twisted to cause rotation of the roll in a direction opposite to that of the roll 14. Further, since the pulley 22 is of a size greater than the pulley 16, the roll 20 will be rotated at less velocity than the roll 14. Spaced legs 24 are secured to the opposite sides of the hood 18 and engage the adjacent sides of the frame 5; the rear legs being pivotally secured to the frame sides as at 24.

Upon the forward end of the longitudinal frame 5, a plow 25 is secured, the mold board thereof being inclined and extending to a point in proximity of the disintegrating roll 14 whereby such earth as turned by the same will be moved upwardly into engagement with the same and the upper disintegrating roll 20. To prevent lateral displacement of the earth, guides 26 are arranged upon the opposite sides of the plow mold board. A runner 27 is also carried by the plow and extends rearwardly of the same in order that movement of the same over the surface of the soil will be facilitated.

Brackets 28 are secured to the opposite forward sides of the frame 5 and are pivotally connected to a beam 29 as at 30; a segment 31 being formed thereon whereby an adjusting lever 32 carrying the usual locking pawl may be engaged therewith, and as a consequence, the beam 29 adjusted vertically. A leg 33 is carried upon the pivotal beam 29 and has mounted on its lower end a colter 34, this colter being arranged adjacent one side of the plow point and obviously serving as efficient means whereby the depth of its engagement with the soil will be regulated due to the movement of the lever 32.

To the rear end of the frame 5 a waste receptacle 35 is secured, diagonal brace arms 36 being engaged with its lower end and with portions of the opposite sides of the frame 5. In this connection, it is to be noted that the waste receptacle 35 is in longitudinal alinement with the screening apron 11 in order that the refuse or weeds and foreign growth may be discharged from the same thereinto.

In operation, with the plow adjusted to the proper depth by means of the lever 32, the machine is moved over a field or other surface to be cultivated thereby, it of course being understood that the same has connection with suitable draft means. During such movement, power is transmitted from the engine 2 to the disintegrating rolls 14 and 20 and such earth as turned upwardly by the plow will be directed upon the mold board thereof into engagement with the said rolls. Due to the fact that the upper roll 20 is rotated at less velocity than the lower roll 14, the earth, should it be in clods, will be thoroughly disintegrated or broken thereby, and then discharged by way of the lower roll 14 onto the endless apron 11. Of course, a portion of the earth will be permitted to drop between the disintegrating rolls onto the field, the same having been thoroughly broken or disintegrated. Due to the pivotal engagement of the hood 18 with the opposite sides of the frame 5, it will be appreciated that the forward portion thereof will be permitted to swing upwardly should the teeth of the rolls 14 and 20 engage hard substances such as rock or the like, thus, preventing fracturing of the same and the chipping of the peripheral surfaces of these said rolls. The hood 18 with its curved deflecting wall 19 will efficiently serve as means for directing the earth onto the screening apron 11, the said deflecting wall also serving as means for breaking such clods as thrown into engagement therewith due to high velocity at which the roll 14 is rotated. The earth now upon the screening apron 11 is thoroughly disintegrated and, obviously, sifts through the mesh thereof onto the field below, while the weeds and other foreign growth formerly contained thereby are passed rearwardly of the apron and from the same into the waste receiving receptacle 35. Thus, the cultivation of the soil, including the plowing, harrowing and weeding is accomplished in a single operation.

Due to the simplified arrangement of the various elements of the construction, it will be appreciated by workers in the art, that they may be readily removed or repaired as it becomes necessary, the hood 18 being readily removed by disengaging the fastening devices of the spaced legs 24 with the adjacent sides of the frame 5.

It is of course to be understood, that any source of motive power may be arranged upon the machine for driving the disintegrating roll and the endless apron, such as conditions or presence may dictate and further, that any form of draft means may be connected to the same for drawing it over a field or other surface. If desired, the rolls and endless apron may by means of suitable gears, be connected to the power transmitting apparatus of the ordinary tractor, when such a device is used for drawing the combined earth disintegrater and weeder over a field.

Manifestly, the construction shown is capable of considerable modification, and such modification as is within the scope of my claims, I consider within the spirit of my invention.

I claim:

1. In a cultivator of the character described, a carriage, a plow arranged forwardly thereof, disintegrating rolls rotatable on the carriage adjacent the plow, one of said rolls being rotated at a greater velocity than the other, movable screening means arranged rearwardly of the rolls, and a hood having a curved deflecting wall removably arranged over the screening means.

2. In a cultivator of the character described, a carriage, a plow arranged forwardly thereof having its mold board extending diagonally into engagement with the carriage, disintegrating rolls rotatably mounted on the carriage and having spirally disposed teeth arranged upon their peripheries, one of said rolls being rotated at a greater velocity than the other, movable screening means arranged rearwardly of the rolls, and a hood having a curved deflecting wall positioned over the screening means.

3. In a cultivator of the character described, a carriage, a diagonally disposed frame on the carriage, a plow arranged forwardly of the carriage and having its mold board extending into proximity thereof, a disintegrating roll rotatably mounted in the frame adjacent the forward end thereof, a hood detachably arranged over the frame having a curved deflecting wall, a second disintegrating roll rotatably mounted in the hood and arranged in advance of first said mentioned roll, said first disintegrating roll being rotated at a greater velocity than the other, and movable screening means arranged in the frame rearwardly of the disintegrating roll.

4. In a cultivator of the character described, a carriage, a diagonally disposed frame on the carriage, a plow arranged forwardly of the frame and having the mold board thereof extended into proximity of said frame, a disintegrating roll having spirally disposed teeth arranged about its periphery rotatably mounted adjacent the forward end of the frame, a movable screening means arranged in the frame rearwardly of said disintegrating roll, a hood having a curved deflecting wall removably arranged over the screening means, a second disintegrating roll mounted in the hood and arranged forwardly of said first disintegrating roll, the first disintegrating roll being adapted to rotate at a greater velocity than the said second roll, and a waste receptacle secured to the rear end of the carriage communicating with the screening device.

5. In a cultivator of the character described, a wheeled carriage, a diagonal longitudinally extending frame on the carriage, a plow arranged forwardly of the frame and having its mold board extending into proximity thereof, a disintegrating roll rotatably mounted adjacent the forward end of the frame, an endless screening apron movable longitudinally of the frame, a waste receptacle secured to the frame and communicating with the apron, a hood removably arranged over the screening apron, a second disintegrating roll mounted in said hood slightly in advance of said first disintegrating roll, said hood having the rear wall thereof curved, a beam pivotally connected to the frame, a colter arranged on the beam, and means for adjusting the beam and colter.

6. In a cultivator of the character described, a wheeled carriage, a diagonal longitudinally extending frame on the carriage, a plow arranged forwardly of the frame and having its mold board extending into proximity thereof, a disintegrating roll rotatably mounted adjacent the forward end of the frame, an endless screening apron movable longitudinally of the frame, a waste receptacle secured to the frame and communicating with the rear of the apron, a hood arranged over the screening apron and pivotally secured at one end to the sides of said frame, a second disintegrating roll mounted in the hood slightly in advance of the first disintegrating roll, said hood having the rear wall thereof curved, a beam pivotally connected to the frame, a colter arranged on the beam and means for adjusting the beam and colter vertically.

In testimony whereof, I affix my signature hereto.

VIRGIL L. McGREGOR.